United States Patent [19]
Groce et al.

[11] 3,777,217
[45] Dec. 4, 1973

[54] FAULT INDICATOR APPARATUS FOR FAULT LOCATION IN AN ELECTRICAL POWER DISTRIBUTION SYSTEM

[76] Inventors: Larry A. Groce, 2212-P E. Park Row, Arlington, Tex. 76010; Darwin S. Renner, 1314 Cedar Hill Ave., Dallas, Tex. 75208

[22] Filed: Jan. 10, 1972

[21] Appl. No.: 216,370

[52] U.S. Cl.................. 317/33 C, 317/151, 324/51, 324/133, 340/253 A
[51] Int. Cl. .......................................... H01h 47/32
[58] Field of Search.......................... 317/33 C, 151; 324/133, 51; 340/253 A, 253 C

[56] References Cited
UNITED STATES PATENTS
3,685,035   8/1972   McClain et al. ................ 340/253 A

*Primary Examiner*—James D. Trammell
*Attorney*—Warren H. Kintzinger

[57] ABSTRACT

A current transformer is coupled to the cable to be monitored and furnishes both power and signal energy to the indicator apparatus. The power and signal energies are separated and the power regulated for constant performance over the entire operating current range. This range extends from the minimum no load cable current up through the highest fault amperes to be indicated. Two capacitors are charged by the power element. The first capacitor is discharged through a switch into one side of a center tapped indicator coil each time its firing voltage is reached. This causes the indicator to show "N" or normal. The second capacitor likewise discharges through a similar switch into the other side of the indicator coil, causing it to indicate the opposite, "F" or fault position. The firing point of the second switch is however higher than that of the first and does not normally fire since the peak voltage attained is that of the first switch. If now a portion of the signal energy from the input is added to the power supply of the second switch to make up the balance needed for firing, it will discharge the second capacitor. This occurs when the signal portion of the input rises to the value denoting fault current. In the relatively isolated instances when the second ("F") switch does fire it takes command and interrupts or prevents firing of the first. In series with each switch is a regeneratively connected transistor to return the switch to its initial or open position after each firing.

An added feature, for some uses, is a darlington device to rapidly dissipate power stored in the apparatus whenever the cable current goes to zero (or below minimum). This prevents an "F" indication even in the presence of fault current, for some time interval after energy is resumed. This feature is optional.

13 Claims, 5 Drawing Figures

FAULT INDICATOR APPARATUS FOR FAULT LOCATION IN AN ELECTRICAL POWER DISTRIBUTION SYSTEM

BACKGROUND OF THE INVENTION

This invention relates to fault indicator apparatus for determing the location of a fault in an electrical power distributing system and is particularly useful in connection with underground type power distribution systems.

In recent years, considerable interest has been generated, particularly among utility companies, in underground power distribution systems for residential subdivisions, shopping centers and the like. In addition to being attractive in appearance by eliminating unsightly overhead power lines, such underground systems are potentially not as vulnerable to environment and sabotage and are more accessible for maintenance purposes since the distribution transformers are not mounted upon poles high above the ground.

Underground power distribution systems suffer from a disadvantage, however, in that faults are not as easily detected as they would be when they occur on an overhead power line. As a consequence of this detection difficulty, prior art techniques have involved coupling some type of fault indicator near each of the subsurface distribution transformers for enabling a service man to determine the location of a cable fault by visual inspection of such fault indicators. In general, however, the design of these existing fault indicators has not been entirely satisfactory.

It is an object of the invention, therefore, to provide new and improved and more reliable fault indicator apparatus for determining the location of a fault in an electrical power distribution system.

It is another object of the invention to provide new and improved fault indicator apparatus having a greater degree of flexibility with respect to the type of power distribution system in which it may be used.

It is a further object of the invention to provide new and improved fault indicator apparatus which is particularly useful in connection with underground power distribution systems.

For a better understanding of the present invention, together with other and further objects thereof, reference is had to the following description taken in connection with the accompanying drawings, the scope of the invention being pointed out in the appended claims.

BRIEF DESCRIPTION OF THE DRAWINGS

Referring to the drawings.

DESCRIPTION OF THE FIGURE 1 POWER DISTRIBUTION SYSTEM

Figure 1:
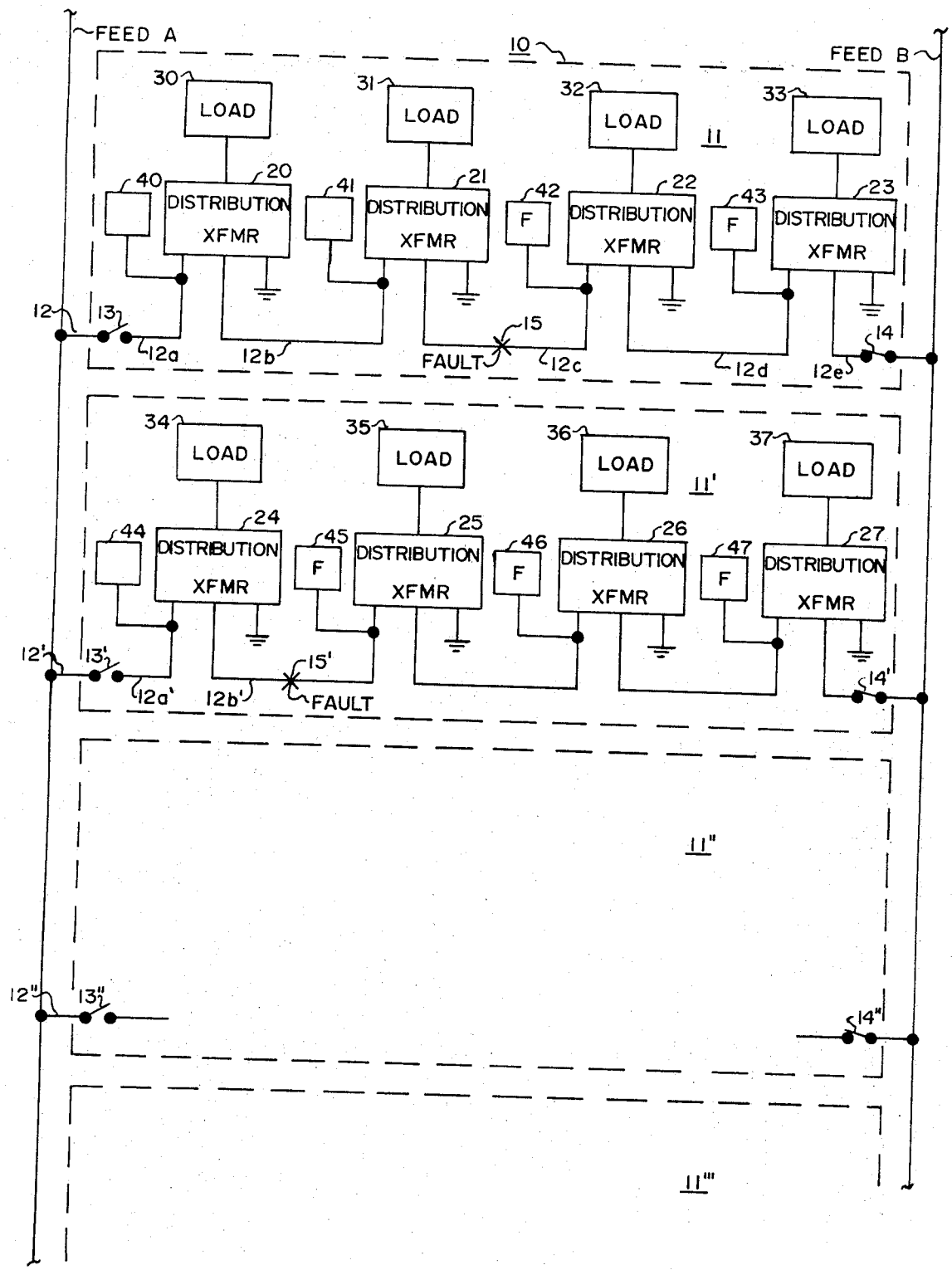
FIG. 1 illustrates in block diagram form one type of power distribution system incorporating fault indicator apparatus constructed in accordance with the present invention.

Referring to FIG. 1, there is shown an alternating current electrical power distribution system 10 showing a typical manner of using fault indicator apparatus constructed in accordance with the present invention. In this regard, the particular power distribution system shown in FIG. 1 is not to be taken as restrictive of the invention because, as will be appreciated by those skilled in the art, the fault indicator apparatus of the present invention may be readily utilized with various other types of power distribution systems.

The power distribution system 10 includes a plurality of looped trunk lines 11, 11', 11'', 11''', etc., which are connected at one end to a first primary feeder cable A through circuit breakers 13, 13', 13'', 13''', etc., respectively, and are connected at the other end to a secondary primary feeder cable B through circuit breakers 14, 14', 14'', 14''', etc., respectively. Each of the feeder cables A and B are coupled to a primary alternating current voltage source (not shown). Trunk line loop 11 includes a power cable 12 having a plurality of distribution transformers 20-23 coupled in parallel thereto at intermediate points therealong. The sections of cable 12 located intermediate the circuit breakers 13 and 14 and distribution transformers 20-23 are designated as 12a-12e. The outputs or secondary sides of distribution transformers 20-23 are coupled to loads 30-33, respectively, each of which may be, for example, the utility service entrance of a house.

Similarly, trunk line loop 11' includes a power cable 12' having a plurality of distribution transformers 24-27 connected in parallel thereto at intermediate points therealong, the intermediate sections of cable 12' being designated as 12a'-12e'. The secondary windings of distribution transformers 24-27 are coupled to loads 34-37, respectively, each of which may be, for example, the utility service entrance of a house. The remaining trunk line loops 11'', 11''', etc., are of similar construction. In this regard, it should be noted that the following description is referenced in most instances to only the trunk line loop 11, it being understood that similar considerations are equally applicable to the other trunk line loops 11', 11'', 11''', etc.

Assuming the power distribution system 10 is of the underground type and considering first the trunk line loop 11, each of the distribution transformers 20-23 is located below ground, the various cable sections 12a-12e also being located below ground and running between the different distribution transformers. Each of the cable sections 12a-12e is preferably adapted for easy removal from the loop. To this end, these cable sections preferably use appropriate connectors at each end thereof to enable their plugging and unplugging from the remainder of the trunk cable 12. Thus, a fault occuring in any one of the cable sections may be repaired after removing that section from the loop. Similar considerations apply to the other trunk line loops 11', 11'', 11''', etc.

During a typical mode of operation, circuit breaker 13 is normally open and circuit breaker 14 is normally closed, the electrical power to trunk cable 12 being supplied by feeder cable B. The normally open circuit breaker 13 is constructed or programmed to close when it senses a power loss caused by, for example, either a fulat in the feeder cable B or in trunk cable 12.

A plurality of fault indicator units 40-43, each constructed in accordance with the present invention, are coupled to the high-voltage trunk cable 12. Similarly, a second plurality of fault indicator units, each constructed in accordance with the present invention, are coupled to the high-voltage trunk cable 12'. Each of these fault indicator units 40–47 is constructed to accurately and immediately indicate the location of a fault within the associated trunk cable so that this fault may be repaired in the shortest possible time.

Considering loop 12, for example, assume that a short circuit type fault occurs at point 15 in the cable section 12c intermediate distribution transformers 21 and 22. As a consequence of this fault, a surge of current initially flows through cable sections 12e, 12d and that portion of 12c to the right of the fault 15. This trips fault indicators 42 and 43, the symbol "F" shown on such units representing that a fault indication is being provided by such units. Such surge current also opens the normally closed circuit breaker 14. Fault indicator units 40 and 41 remain untripped because no surge current has passed through the cable sections to which they are coupled. Shortly thereafter, the normally open circuit breaker 13 temporarily closes in response to the loss of power in the cable 12. The fault current then commences to flow through this circuit breaker 13 and causes it to reopen. Thereafter, both the circuit breakers 13 and 14 are open and will not again automatically close into the fault 15. As will be seen, fault indicator units 40 and 41 are not tripped by the momentary current flow via circuit breaker 13.

Since only fault indicator units 42 and 43 have been tripped and fault indicator units 40 and 41 have remained untripped, a visual inspection by the lineman of all the fault indicator units immediately indicates the location of the fault as being within the cable section 12c. Ths faulted section 12c may then be unplugged and removed from the trunk cable 12 and both the circuit breakers 13 and 14 manually closed to restore service to the various loads 30–33. The faulted cable section 12c may then be repaired and replaced and the circuit breaker 13 manually reopened to return the loop 11 to its normal operation as previously considered.

In a similar manner, the occurrence of a fault in the trunk cable 12' at point 15' causes a tripping of fault indicator units 45–47 (indicated by "F" symbol), fault indicator unit 44 remaining untripped (indicated by absence of "F" symbol). Visual inspection of the fault indicator units 44–47 immediately indicates the location of the fault as being in the cable section 12b'.

Each of the fault indicator units 40–47 is constructed so as to be tripped only when the current in the portion of the trunk cable associated therewith exceeds a predetermined value corresponding approximately to the value required to open one of the circuit breakers 13, 14, etc. In addition, during the brief period that normally open circuit breaker 13 temporarily closes into the fault, the fault indicator units between breaker 13 and the fault (units 40 and 41, for example) remain untripped, thus preventing false indication of faults at other locations along the trunk cable 12. This property of the indicators is called the "directional feature." The "directional" feature of the indicator described herein is an optional added one and does not affect its operation as an ordinary indicator should this option not be exercised (some parts deleted). Neither is its operation as an ordinary indicator affected if the directional feature is present.

If the trunk cable 12 is feedable from only one end, as from feeder B only, then the directional feature of the indicators would not be required. Obviously, at the same time, in such a case (with only one feeder B) the service available to customers would be materially impaired, in case of a fault.

DESCRIPTION OF FIGURE 2 FAULT INDICATOR APPARATUS

Figure 2:
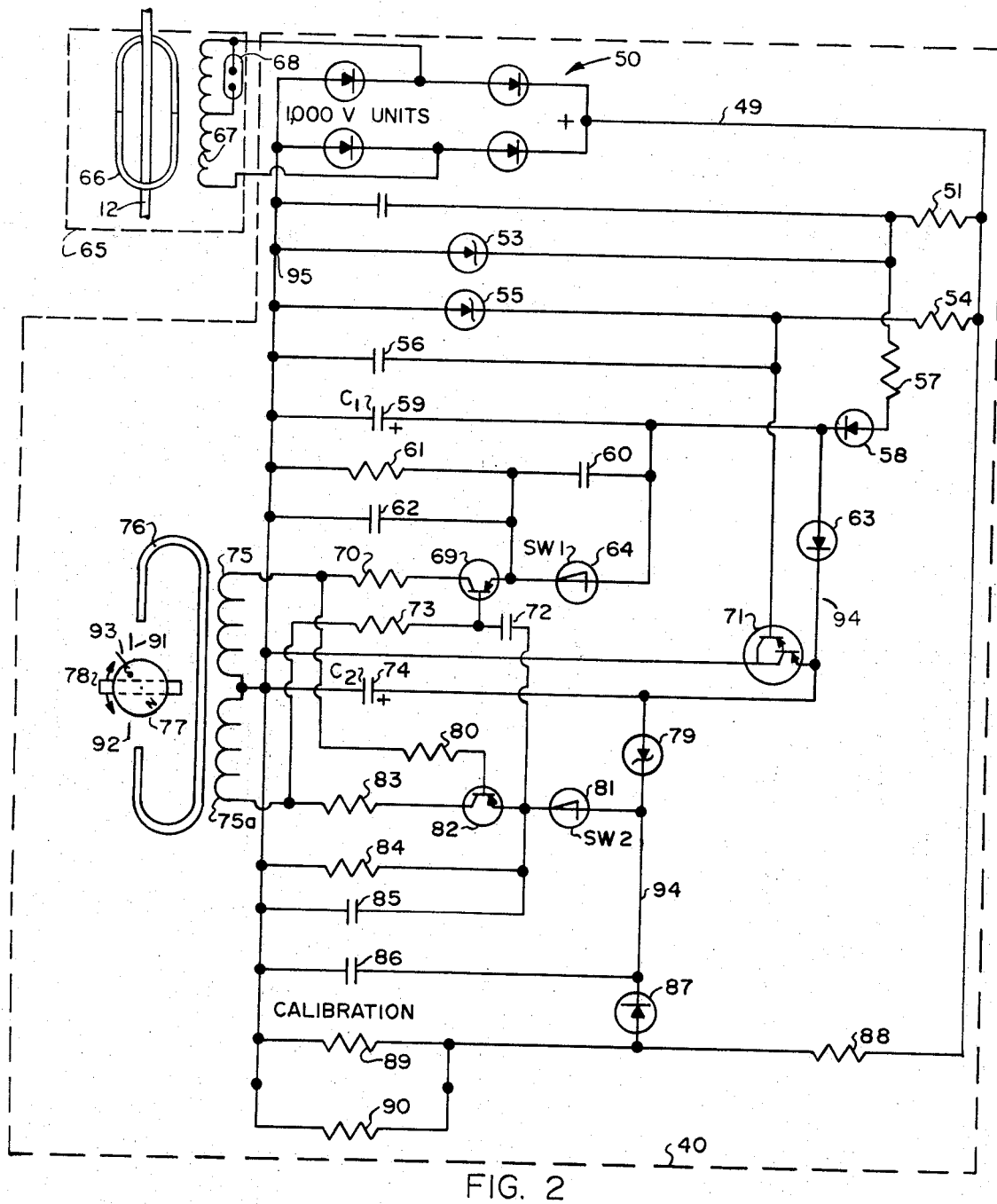
FIG. 2 is a detailed schematic circuit diagram of fault indicator apparatus constructed in accordance with the present invention.

Referring now to FIG. 2, there is shown a schematic circuit diagram of one of the fault indicator units 40–47 of FIG. 1. For the sake of example, the fault indicator apparatus shown in FIG. 2 is assumed to be the fault indicator 40 of FIG. 1, it being understood that each of the other fault indicators units 41–47 is of this same construction.

The indicator consists of two parts, the current transformer 65 and the indicator unit 40. The current transformer serves as both a current sensor and a source of power to operate the indicator. The split core 66 is secured around the power cable 12. In order to obtain enough voltage at low cable currents (such as 2½ A.) the output 67 is rather high impedance. The element 68 is a spark gap type surge protector. This limits the output of 67 so that the coil and indicator input are not damaged should the fault current in 12 be considerably above the operating range. Element 68 is tapped on 67 to adjust its input to available ratings. The normal operating range of the sensor would be approximately up to 1500 amperes.

Figure 3:
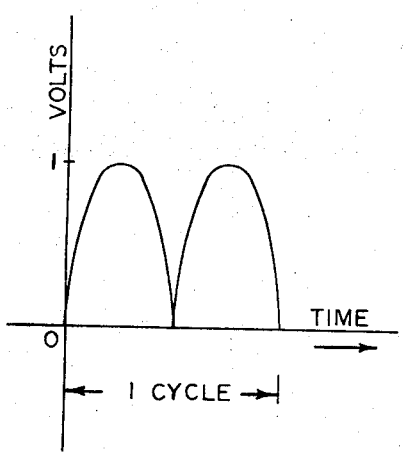
FIG. 3 is a time graph of the input at "49," FIG. 2, for median cable currents not in the fault range.
Figure 4:
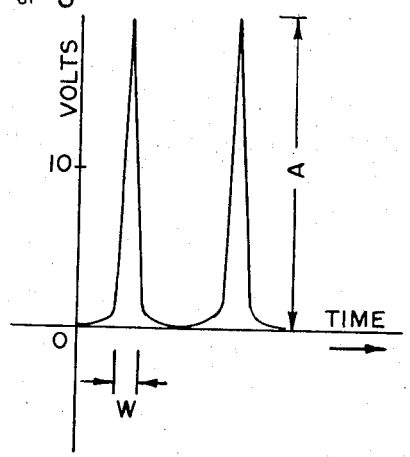
FIG. 4 is a time graph of the input at "49," FIG. 2, when the cable current is in the fault range.

The output of 67 is converted by 50 to full wave or unidirectional form. Up to about 50 amperes the output at 49 is according to FIG. 3. Beyond this the form is that of FIG. 4. In FIG. 4 the active region of core 66 (between flux saturations) occupies an ever narrowing increment of time as the amperes in 12 increase. As the flux range is traversed in shorter times, the amplitude A increases in proportion. The average value of the waveform, FIG. 4, however, stays approximately constant. In other words the power output of 67 increases only so long as waveform, FIG. 3, holds.

As the minimum operating current (such as 2½ A.) is approached from zero, the voltage across zener regulator 53 is approximately the regulated value. It is this voltage which operates the indicator. Thus at the minimum operating current, the entire output of 67 is available for use. The drop across resistor 51 is negligible. As the current goes on up through the operating range, the voltage 53 is held constant such that the operation character is independent of current value in 12.

The operating voltage 53 charges first storage capacitor $C_1$ (59) through timing resistor 57 and diode 58. The diode 58 prevents the partial discharge of $C_1$ during portions of the cycle at the low end of the current range. At the same time, through diode 63, the second storage capacitor $C_2$ (74) is being charged. The diode 63 allows the first capacitor $C_1$ to be discharged without affecting the charge of the second, $C_2$.

The capacitors, when charged, serve as power reservoirs to move the indicator mechanism as the circuit dictates. The power from the capacitors, $C_1$, $C_2$, is transferred to the mechanism through silicon unilateral or bilateral switches, 64 and 81. These are voltage sensitive devices which go from open to closed when the voltage across them reaches a critical value, in this case approximately 8.5 volts. Thus, the switches are converted from the nonconductive state to the conductive state at a threshold potential voltage between 8 and 9 volts. One of the features of the unilateral switches is their very low temperature coefficient, making temperature compensation unnecessary.

When the voltage cross $C_1$ reaches the firing point of Sw 1, there is a sudden application of this voltage through transistor 69 to the indicator coil 75. This sets or resets the indicator to "normal" or "N." This discharges $C_1$ but not $C_2$. The maximum voltage reached by $C_2$ is the same as $C_1$ less the drop across diode 63. Coil 75 is center tapped and its opposite end 75a holds transistor 69 on regeneratively during the discharge of $C_1$. In about 0.3–0.4 second the voltage of $C_1$ and the current in 75 are no longer sufficient to maintain the "on" state and the transistor 69 is regeneratively switched "off." This allows the voltage on Sw 1 to go to zero and thus to its non-conductive state. Without this Sw 1 would stay conductive and $C_1$ could not recharge. As it is, it begins charging again and the cycle repeats every 30 seconds approximately.

Since $C_1$ discharges each time its voltage reaches a given value, the voltage on $C_2$ stays constant at the same value less the diode drop as mentioned before. Actually the voltage on Sw 2 is the value on Sw 1 less the drop of diode 79 as well as that of 63. This insures that without a trigger, Sw 2 will not have firing voltage. In addition, the firing point of Sw 2 is usually selected a little higher than that of Sw 1. The pulses of FIG. 4 divided by the resistors 88, 89 and 90, are applied through diode 87 to supply the extra needed voltage to fire Sw.2. This of course occurs when the pulses are of a magnitude representative of the fault current to be indicated. The diode 87 is needed to prevent the leakage of the static voltage across SW 2 to resistors 89 and 90. When the trigger is applied, then Sw 2 fires and the events (in Sw 2 and transistor 82) are repeated as with Sw 1 and transistor 69. This time however both $C_1$ and $C_2$ are discharged through 75a thus providing increased drive for the isolated event as contrasted to the cyclic one. Diode 79 is a low voltage zener and as such ties high point of Sw 2, (94), to the voltage of $C_2$. Thus any subsequent pulses are reduced materially in amplitude and cannot fire Sw 2. Since both storage capacitors have to be recharged after the isolated firing of Sw 2, as contrasted to only one for Sw 1, the time required is twice as long.

This aids the achievement of the 30 second approximate interval before there will be a fault indication (in the presence of fault current) after the cable has been disconnected, as by breaker, and re-energized. In such a case, if Sw 2 has not been triggered (the unit is not between fault and source), then a relatively rapid means of discharging both storage capacitors is required. Darlington semi 71 accomplishes this function whenever the cable excitation is removed. This is a very low input current device which therefor can be operated from a high impedance circuit requiring negligible part of the input energy. Regulator 55 has a somewhat higher level than 53 such that at no times does 71 come into play during storage discharges even at the minimum current level in cable 12. As with regulator 53, 55 assures constant performance characteristics over the wide range of currents in cable 12.

If the directional, or no fault response, for the first 30 seconds (or so) after the cable is energized, in the presence of fault current, is not desired, then the semi 71 and its accompanying control elements 54, 55 and 56 may merely be omitted. As inferred above these control elements keep the semi 71 cut off except when the cable current is interrupted. The low voltage zener 79 may also be replaced with an ordinary diode as there would be no need to suppress triggering pulses due to the fault current. By omitting four parts and going from a zener to a straight diode the directional feature is dropped out with no effect on performance otherwise.

Should a fault occur during the switching period of Sw 1, an event of low probability, capacitor 72 is provided to increase the positive voltage feedback from Sw 2 sufficiently to stop the event in Sw 1 and substitute therefor that of Sw 2. It will be noted that the feedback to the transistor opposite the switch, such as transistor 69 to switch 81, is in a direction to cut off the transistor. The indicator can occupy both positions in quick succession with the fault position in command. Sws 1 and 2 are very fast acting and can be triggered by micro-second pulses. To maintain the voltages across these constant except for the desirable ones here, is the function of capacitors 60, 85 and 86. Capacitor 86 in combination with resistors 88, 89 and 90 can have some effect on the speed of response although practically the RC delay here would be negligible with the values used.

Figure 5:
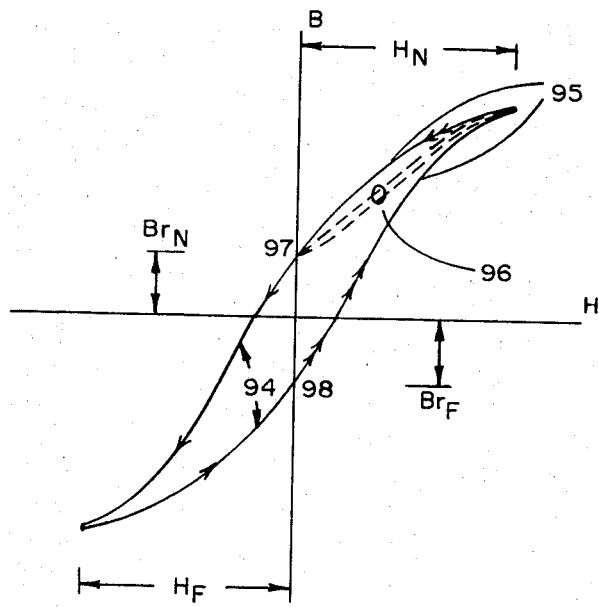
FIG. 5 is a multiple B-H loop graph of the indicator core structure, "76," FIG. 2.

Some features of the indicator mechanism are worthy of note. The magnetized disc (N-S indicates magnetic axis) rotates through approximately 90 degrees between stops 91 and 92 as seen by tab 93. 78 is the viewing window under which the appropriate signs appear ("N" for normal and "F" for fault). Through design and selection of materials, a magnetic latch is affected. FIG. 5 is a B-H diagram for the total field structure. Resetting occurs along the dotted lines 96. This leaves a residual flux $B_{rN}$ at 97 which will circulate in the absence of coil current and provide latching force. The coil currents themselves in parts 75 and 75a can be independently adjusted by means of the resistors 70 and 83. Thus we may want more latch on the isolated fault position which is energized only once. This can be done such as shown, in FIG. 5, as $H_F$ in contrast to $H_N$. This will leave a larger residual magnetism $B_{rF}$. The magnetic path for the tripping action of Sw 2 is along lines 94 from 97 to 98. The following resetting path is then along lines 95 from 98 back to 97.

OPERATION OF FIG. 2 FAULT INDICATOR APPARATUS

Considering now the operation of fault indicator apparatus when the power cable is first energized. The waveforms of FIG. 3 or FIG. 4 appear at 49 depending upon whether the cable current in 12 is in the lower or upper region of the current range, but assuming not at fault level.

Regulators 53 and 55 assume their values of constant voltage with that of 55 being about 1 volt higher. Capacitors $C_1$ and $C_2$ begin charging with their voltages approaching that of 53 less diode drops as previously noted. Due to these drops the voltage at 94 is less than that at 53 and consequently materially less that of 55. Semi 71 is thus open and plays no part. The voltage at $C_2$ will be less than that at $C_1$ by the amount of diode 63 drop.

The voltage 53 is considerably higher than the firing voltage of Sw 1, for example, 13 volts versus 8.5. At some point Sw 1 will fire connecting capacitor $C_1$ to transistor 69 which closes due to negative voltage fed back from opposite end 75a of winding 75. Current from capacitor $C_1$ thus flows in winding 75 and the disc moves to show "N" or normal in its window. When the current from $C_1$ becomes insufficient to maintain 69 closed, the same opens regeneratively and the current is suddenly cut off and Sw 1 returns to open. $C_1$ begins charging again and the cycle repeats. The indicator mechanism stays constantly at "N" or normal both because of repeating pulses from $C_1$ and the magnetic latch previously referred to. The voltage on capacitor $C_2$ stays essentially constant a volt or more below the firing point of SW 2. Thus Sw 2 is always at the ready to fire.

Assume now the fault at 15 occurs. Indicator 40 sees no fault current and so does not trip to "F." However shortly thereafter breaker 14 opens and cable 12 is momentarily dead. The voltage at 55 goes to zero and semi 71 is turned on. Both capacitors $C_1$ and $C_2$ are discharged. The indicator remains at "N" or normal. Sensing the loss of cable voltage, breaker 13 then closes into cable 12 and fault 15. Indicator 40 sees fault current now but cannot so indicate because both $C_1$ and $C_2$ are discharged and diode 79 suppresses triggering pulses to values many times below tripping level. This condition would hold for as long as 30 seconds but breaker 13 will normally open in one to three cycles returning cable 12 to dead and leave indicator 40 showing "N" or normal. All indicators, similarly, between 13 and fault 15 will likewise indicate "N" or normal.

Indicator 42 and 43 which saw the fault surge will indicate "F" or fault because their capacitors $C_2$ were fully charged. When breaker 14 opens their indicators will remain on "F" because this occurs in one to three cycles and it takes about 30 seconds (approximately) for Sw 1 to fire and reset the indicators to "N." When 13 recloses into the fault again, far less than 30 seconds elapses before 13 senses same and reopens.

Inspection of the indicators will isolate the fault to 12c which may then be unplugged from both ends. Breakers 13 and 14 may now be manually closed and service restored. Cable 12c is then repaired on a nonenergy basis.

If cable 12 were fed from B and 14 only, then only step one of the above fault sequence would occur, or, the action would stop after breaker 14 opens. The indicators would be the same as before but service could not be restored to cable parts 12a and 12b until the fault was repaired.

Should a momentary overload of fault level occur at say 31, indicators 42 and 43 would be tripped as before but when breaker 13 closed into the cable it would remain closed and the cable would remain energized. In about 30 seconds capacitor $C_1$ would be recharged to the firing point of Sw 1 and resetting winding 75 would receive energy to move the indicator back to "N." All indicators would then again read "N" and no fault condition would be indicated.

While there has been described what is at present considered to be a preferred embodiment of this invention, it will be obvious to those skilled in the art that various changes and mdifications may be made therein without departing from the invention, and it is, therefore, intended to cover all such changes and modifications as fall within the true spirit and scope of the invention.

What is claimed is:

1. A single current responsive input means adapted to be coupled to the power system for providing an output voltage whose magnitude is dependent on the current at a predetermined point in the power system;
    a first switch connected to first power storage means and which switches cyclically, independent of the magnitude of the input;
    a second switch connected to second power storage means and which is trigger switched for power flow from said second power storage means in power system fault trigger response to the amplitude of the input as it reaches a predetermined value; and
    an indicator to which both switches are connected and which indicates "normal" when the first switch operates and "fault" when the second switch operates.

2. Fault indicator apparatus in accordance with claim 1, wherein the power distribution system is an alternating current one and wherein the input is rectified to produce a unidirectional output proportional in magnitude to the current at the predetermined point in the power system; and with the unidirectional output constituting a multiple component power supply output including a DC component and a pulse component and their sum.

3. Fault indicator apparatus in accordance with claim 2 wherein the DC component is regulated (constantized) over the minimum to maximum values of the input range and which then serves as a constant power source for operation of the indicator.

4. Fault indicator apparatus in accordance with claim 2 wherein the current responsive input means includes a current transformer adapted to be inductively coupled to the power system at the predetermined point.

5. Fault indicator apparatus in accordance with claim 2 wherein the current responsive input means includes a current transformer adapted to be inductively coupled to the power system at the predetermined point; and the core of said current transformer is of a ferrite material.

6. Fault indicator apparatus in accordance with claim 1 wherein the first and second switches are thyristors.

7. Fault indicator apparatus in accordance with claim 3 wherein the unidirectional pulse component of the power supply is coupled to said second switch to cause it to close when the pulse amplitude reaches a predetermined value.

8. Fault indicator apparatus in accordance with claim 3, wherein first and second storage capacitors are supplied as said first and second power storage means for each of the switches, to which they connect; and said first and second storage capacitors being connected to be charged from the constantized DC power source through resistors and diodes.

9. Fault indicator apparatus as in claim 8, wherein the switches are thyristors operated with dual self triggering magnetic one-shots in series, which speed up the switched wave fronts and then at a lower point in the switched energy, cut off the thyristors sharply such that they are opened; and with the one-shots connected for returning the switches through an indicator winding to the capacitor supplies.

10. Fault indicator apparatus in accordance with claim 8, said second switch is connected to said second storage capacitor through an avalanche diode of proper value to allow application of power supply triggering pulses of fault level only when said second storage capacitor is essentially fully charged.

11. Fault indicator apparatus in accordance with claim 1, wherein the indicator means includes a magnetic field structure upon which is placed a tapped coil, one end of which connects to said first switch and the other end of which connects to said second switch; with the coil top being a common return to the constantized DC supply ; a magnetized disc closely fitting an air gap in this structure and with said magnetized disc equipped with two mechanical stops allowing it to rotate through an angle less than 360°; said disc moveable to against a first stop when said first switch fires and against a second stop when said second switch fires; said disc being provided with signal means positioned on said disc to be moved to appear in a window placed above the disc; and with said window being of clear material substantially impervious to outdoor environment.

12. Fault indicator apparatus in accordance with claim 11, with the indicator means field structure so designed and constructed with proper materials that there exists a remanent magnetizing force in the absence of any energy from either driving switch; with said remanent magnetizing force being in the direction of the last driving pulse and therefore aiding in holding the disc to its last position with therefore a remanent force for both directions; and with both remanent forces being independently adjusted in magnitude through adjustment of two resistors.

13. Fault indicator apparatus in accordance with claim 9, wherein a discharge circuit is provided for both said first and second storage capacitors which is effective only when cable excitation and therefor input is cut off.

* * * * *